(12) United States Patent
Fredrickson et al.

(10) Patent No.: US 6,837,266 B2
(45) Date of Patent: Jan. 4, 2005

(54) REMOTELY ACTUATED MULTIPLE PRESSURE DIRECT ACTING RELIEF VALVE

(75) Inventors: Brant M. Fredrickson, Highland Heights, OH (US); Joel B. Aukerman, Salem, OH (US); Alan E. Smallsreed, Newton Falls, OH (US); Richard T. Conner, Solon, OH (US); Richard A. Olszewski, Garrettsville, OH (US)

(73) Assignee: Permco, Inc., Streetsboro, OH (US)

( * ) Notice: Subject to any disclaimer, the term of this patent is extended or adjusted under 35 U.S.C. 154(b) by 83 days.

(21) Appl. No.: 10/104,259

(22) Filed: Mar. 25, 2002

(65) Prior Publication Data

US 2003/0178067 A1 Sep. 25, 2003

(51) Int. Cl.[7] .............................................. F16K 17/06
(52) U.S. Cl. .................... 137/529; 137/539.5; 137/540; 251/77
(58) Field of Search ................................ 137/529, 535, 137/540, 539.5, 539; 251/77, 337

(56) References Cited

U.S. PATENT DOCUMENTS

| | | | | |
|---|---|---|---|---|
| 2,013,372 A | * | 9/1935 | Work .......................... | 137/529 |
| 2,079,135 A | * | 5/1937 | Turner et al. ................ | 137/529 |
| 2,770,255 A | * | 11/1956 | Goddard ...................... | 137/529 |
| 2,944,564 A | * | 7/1960 | Pettey, Jr. .................... | 137/529 |
| 3,628,553 A | * | 12/1971 | Wells et al. ................. | 137/529 |
| 4,074,695 A | * | 2/1978 | Weirich et al. .............. | 137/508 |
| 4,501,291 A | * | 2/1985 | Siegrist ....................... | 137/529 |
| 6,289,927 B1 | * | 9/2001 | Kaneko ....................... | 137/529 |
| 6,513,545 B2 | * | 2/2003 | Rhone et al. ................ | 137/529 |

* cited by examiner

Primary Examiner—Ramesh Krishnamurthy
(74) Attorney, Agent, or Firm—James A. Hudak

(57) ABSTRACT

A multiple pressure direct acting relief valve is disclosed. The multiple pressure relief valve comprises an actuating cylinder, a relief valve and an adjustment screw interconnecting the actuating cylinder and the relief valve. The relief valve includes a low pressure spring which biases a poppet valve arrangement permitting the poppet valve arrangement to be actuatable at a first pre-determined pressure. The actuating cylinder includes a piston that is biased by a high pressure spring causing an additional compressive force to be applied to the poppet valve arrangement through an actuating rod received through the adjustment screw. When pressure is applied to the piston within the actuating cylinder, an additional compressive force is applied by the high pressure spring and the actuator rod to the poppet valve arrangement causing the poppet valve arrangement to be actuatable at a second pre-determined pressure. Lock nuts are provided on the adjustment screw that interconnects the actuating cylinder and the relief valve. When the lock nuts are disengaged, the position of the adjustment screw can be moved relative to the actuating cylinder and the relief valve permitting the adjustment of both pre-determined actuating pressures for the poppet valve arrangement.

5 Claims, 4 Drawing Sheets

REMOTELY ACTUATED MULTIPLE PRESSURE DIRECT ACTING RELIEF VALVE

TECHNICAL FIELD

The present invention relates, in general, to a remotely actuated relief valve, and, more particularly, to a remotely actuated relief valve that has two adjustable predetermined actuating pressures.

BACKGROUND ART

Trucking companies typically operate both dump trailers and live floor trailers. Dump trailers utilize single acting single rod end telescopic cylinders that extend to raise the dump body and then retract to return the dump body to its transit position. The hydraulic system for dump trailers has a directional control valve integrated into the port end cover of the hydraulic pump used to actuate the telescopic cylinders. When the dump body is in the raise position, pump flow to the tank is blocked and the flow is directed through the load check valve to the hydraulic cylinder. In the neutral position, pump flow to the tank is allowed while the load check valve locks the hydraulic cylinder. When the dump body is in the lower position, both the pump flow and the cylinder flow vent to the tank. A relief valve protects the hydraulic cylinder in both the raise and neutral positions. Dump trailers typically require a flow of 30 to 35 gpm at 2,000 psi.

Live floor trailers have hydraulically powered groups of aluminum floor slats that extend along the length of the trailer. The groups of floor slats move in a four phase cycle. In the first phase of the cycle, the first group of three slats moves to the front of the trailer and the load does not move. Then the second group of three slats moves to the front of the trailer followed by the third group of three slats. Again the load does not move. In the fourth phase of the cycle, all of the slats move to the rear of the trailer and the load moves rearwardly. Live floor trailers require a flow of 30 to 35 gpm at 3,000 psi.

From the foregoing, it is obvious that trucking companies encounter a problem when they operate both dump trailers and live floor trailers since different operating pressures and thus, separate relief valves are required for each application. A truck with a hydraulic system that is set up for dump trailers cannot haul live floor trailers and a truck that is set up for live floor trailers cannot haul dump trailers. Because of this, trucking companies are limited in the use of their assets.

In view of the foregoing, it has become desirable to design a multiple pressure relief valve that allows the hydraulic pump to operate at two adjustable actuating pressures permitting the relief valve and associated circuitry to be operable for both dump trailer and live floor trailer applications.

SUMMARY OF THE INVENTION

The present invention solves the problems associated with separate relief valves required for dump trailer and live floor trailer applications, and other problems by providing a multiple pressure direct acting relief valve comprising an actuating cylinder, a relief valve and an adjustment screw interconnecting the actuating cylinder and the relief valve. The relief valve includes a low pressure spring which biases a poppet valve arrangement permitting the poppet valve arrangement to be actuatable at a first predetermined pressure, such as 2,000 psi. The actuating cylinder includes a piston that is biased by a high pressure spring causing an additional compressive force to be applied to the poppet valve arrangement through an actuator rod received within the adjustment screw. In this manner, when pressure is applied to the piston within the actuating cylinder, an additional compressive force is applied to the poppet valve arrangement, by the high pressure spring, a spring guide and the actuator rod, causing the poppet valve arrangement to be actuatable at a second pre-determined pressure, such as 3,000 psi. Lock nuts are provided on the adjustment screw that interconnects the actuating cylinder and the relief valve. When the lock nuts are disengaged, the position of the adjustment screw can be changed relative to the actuating cylinder and the relief valve permitting the adjustment of both pre-determined actuating pressures for the poppet valve arrangement. The remotely actuated multiple pressure direct acting relief valve of the present invention can be incorporated into the control valve associated with the hydraulic pump utilized in the hydraulic system for dump trailers and live floor trailers.

DESCRIPTION OF THE PREFERRED EMBODIMENT

Figure 1:
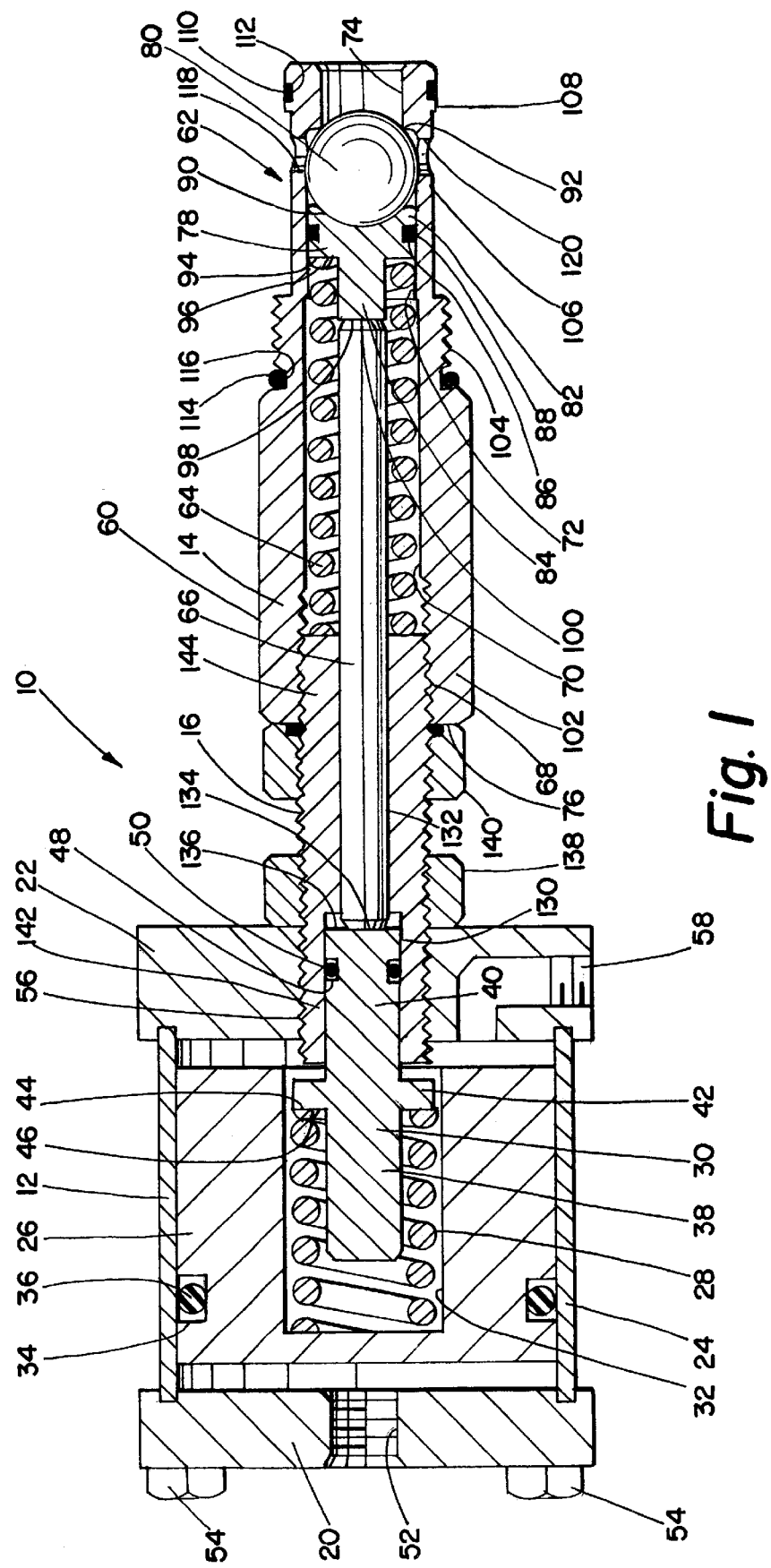
FIG. 1 is a cross-sectional view of the remotely actuated multiple pressure direct acting relief valve of the present invention.

Referring now to the drawings where the illustrations are for the purpose of describing the preferred embodiment of the present invention and are not intended to limit the invention described herein, FIG. 1 is a cross-sectional view of the multiple pressure direct acting relief valve 10 of the present invention. The multiple pressure relief valve 10 is comprised of an actuating cylinder 12, a relief valve 14 and an adjustment screw 16 interconnecting the actuating cylinder 12 and the relief valve 14.

The actuating cylinder 12 is comprised of oppositely disposed end plates 20, 22, a sleeve member 24 disposed between end plates 20, 22, a piston 26 received within sleeve member 24, a high pressure spring 28 and a spring guide 30. Piston 26 has a blind bore 32 therein sized so as to receive high pressure spring 28. A circumferential recess 34 is provided in the body of piston 26 to receive an O-ring 36. Spring guide 30 is comprised of a first reduced diameter portion 38, a second reduced diameter portion 40 and a third larger diameter portion 42 interposed between first diameter portion 38 and second diameter portion 40. First diameter portion 38 of spring guide 30 is received within high pressure spring 28 until surface 44 on third diameter portion 42 of spring guide 30 contacts end 46 of spring 28. First diameter portion 38 of spring guide 30 is shorter than the overall length of spring 28 permitting first diameter portion 38 of spring guide 30 to be movable within spring 28 in order to compress same. Second diameter portion 40 of spring guide 30 has a circumferential recess 48 provided therein to receive an O-ring 50. End plate 20 is provided with a threaded inlet bore 52 and fasteners 54 to hold the actuating cylinder 12 together. End plate 22 is provided with a threaded bore 56 and a passageway 58 for venting to the atmosphere.

Relief valve 14 is comprised of a relief valve housing 60, a poppet valve arrangement 62, a low pressure spring 64 and an actuating rod 66. The relief valve housing 60 has a bore therethrough including a first bore portion 68, a second bore portion 70, a third bore portion 72, and a fourth bore portion 74. First bore portion 68 originates adjacent end 76 of relief valve housing 60 and is threaded. First bore portion 68 terminates into second bore portion 70 which, in turn, terminates into third bore portion 72 which, in turn, terminates into fourth bore portion 74. The diameter of third bore portion 72 is slightly less than the diameter of second bore portion 70, and the diameter of fourth bore portion 74 is less than the diameter of the third bore portion 72. First bore portion 68, second bore portion 70 and third bore portion 72 are sized so as to receive low pressure spring 64. Poppet valve arrangement 62 includes a poppet holder 78 and a spherical actuating poppet 80. Poppet holder 78 is comprised of a first larger diameter portion 82 and a second smaller diameter portion 84. First larger diameter portion 82 of poppet holder 78 has a circumferential recess 86 provided in the outer surface thereof to receive an O-ring 88. First larger diameter portion 82 of poppet holder 78 also includes a spherical recess 90 oppositely disposed from second smaller diameter portion 84. Spherical recess 90 is sized so as to receive actuating poppet 80. A valve seat 92 is provided adjacent the junction of third bore portion 72 and fourth bore portion 74 of relief valve housing 60 and is configured to receive actuating poppet 80. Second smaller diameter portion 84 of poppet holder 78 is received within low pressure spring 64 so that end 94 of low pressure spring 64 contacts surface 96 on first larger diameter portion 82 of poppet holder 78. Actuating rod 66 is also received through low pressure spring 64 so that end 98 of actuating rod 66 contacts end 100 of second smaller diameter portion 84 of poppet holder 78. Relief valve housing 60 is provided with a first outer diameter portion 102, a threaded portion 104, a second outer diameter portion 106 and a third outer diameter portion 108. An O-ring 110 is provided within a circumferential recess 112 in third outer diameter portion 108 of relief valve housing 60. An O-ring 114 is provided within a circumferential recess 116 between first outer diameter portion 102 and threaded portion 104 of relief valve housing 60. Oppositely disposed cross-bores 118, 120 are provided through second outer diameter portion 106 of relief valve housing 60 adjacent the junction of third bore portion 72 and fourth bore portion 74 of relief valve housing 60.

Adjustment screw 16 has a first bore portion 130 which terminates into a through bore portion 132. First bore portion 130 is sized so as to receive second reduced diameter portion 40 of spring guide 30. Through bore portion 132 has a smaller diameter than first bore portion 130 and is sized so as to receive actuating rod 66 which is positioned therein so that end 134 of actuating rod 66 contacts end 136 of spring guide 30. The outer surface of adjustment screw 16 is threaded throughout its entire length and lock nuts 138, 140 are threadably received thereon. Lock nut 140 is of the sealing type. End 142 of adjustment screw 16 is threadably received within threaded bore 56 in end plate 22 of actuating cylinder 12. Oppositely disposed end 144 of adjustment screw 16 is threadably received within threaded first bore portion 68 of relief valve housing 60. Lock nut 140 is threadably advanced or retracted on adjustment screw 16 so as to lock or unlock the position of the adjustment screw 16 relative to the relief valve housing 60. When in the unlocked position, adjustment screw 16 can be threadably advanced or retracted within first bore portion 68 of relief valve housing 60 so as to increase or decrease the pre-load on low pressure spring 64, thus allowing actuating poppet 80 to operate at a first pre-determined pressure, such as 2,000 psi. Similarly, lock nut 138 is threadably advanced or retracted on adjustment screw 16 to lock or unlock the position of the adjustment screw 16 relative to the actuating cylinder 12. When in the unlocked position, adjustment screw 16 can be threadably advanced or retracted within threaded bore 56 in end plate 22 of actuating cylinder 12 so as to increase or decrease the pre-load on high pressure spring 28. When pressure is supplied to actuating cylinder 12, the pressure through the high pressure spring 28 acts through spring guide 30 and actuating rod 66 to poppet valve arrangement 62 and is combined with the pre-load from the low pressure spring 64 causing poppet 80 to operate at a higher second pre-determined pressure, such as 3,000 psi. In essence, the actuating cylinder 12 operates in parallel, rather than in series, with the low pressure spring 64 allowing the actuating cylinder 12 to be substantially smaller and improving the overall performance of the relief valve 14 by reducing the cracking to full pressure differential of the relief valve 14.

Operationally, if no pressure is being applied to the actuating cylinder 12, the piston 26 is free to move therein and the high pressure spring 28 seeks its free length. In this case, the actuating poppet 80 is positioned on the valve seat 92 in the relief valve housing 60 and remains thereon until its senses that the first pre-determined pressure, such as 2,000 psi, has been reached. When the first pre-determined pressure has been reached, the actuating poppet 80 moves off its valve seat 92 compressing low pressure spring 64. Movement of the actuating poppet 80 allows fluid flow from the working hydraulic circuit through fourth bore portion 74 of relief valve housing 60 and through the oppositely disposed cross bores 118, 120 therein. In this case, the actuator rod 66 does not apply a force through poppet holder 78 to the actuating poppet 80 since the piston 26 is free to move and the high pressure spring 28 is at its free length. When pressure is applied to the piston 26 in the actuating cylinder 12, the piston 26 moves so as to compress the high pressure spring 28 from its free length to its pre-loaded length. The compressive force provided by the high pressure spring 28 is transmitted through the spring guide 30 and the actuating rod 66 to the poppet holder 78. Thus, additional compressive force is applied to the poppet holder 78 and the actuating poppet 80. When a second pre-determined pressure, such as 3,000 psi, is applied to the actuating poppet 80, the poppet 80 moves off of valve seat 92 allowing fluid flow from the working hydraulic circuit through fourth bore portion 74 of relief valve housing 60 and through the oppositely disposed cross bores 118, 120 therein. In this manner, the relief valve 14 is operable at two different pre-determined actuation pressures, and the actuation pressures can be easily changed.

Figure 3:
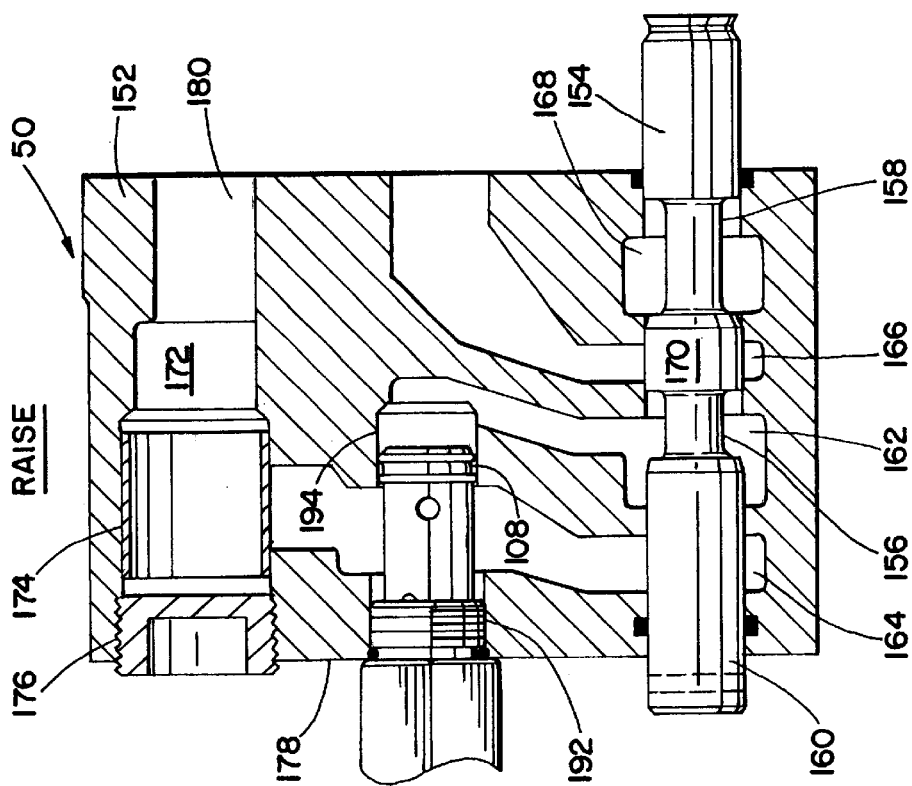
FIGS. 2–4 are elevational views of the multiple pressure relief valve of the present invention installed within a control valve which is in the neutral, raise and lower positions, respectively.
Figure 2:
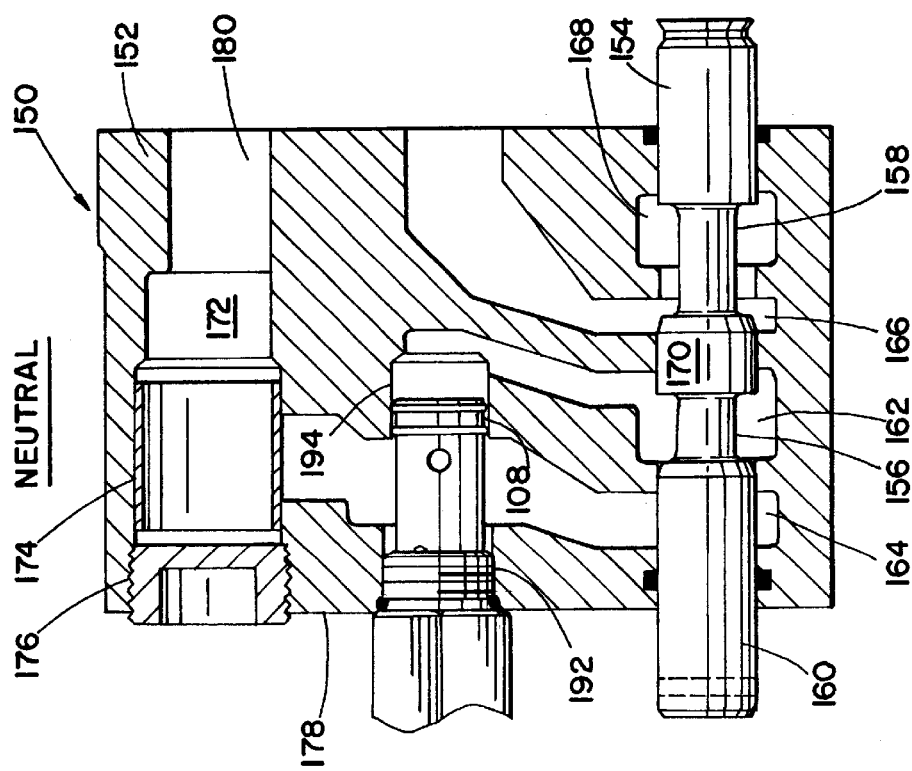
Figure 5:
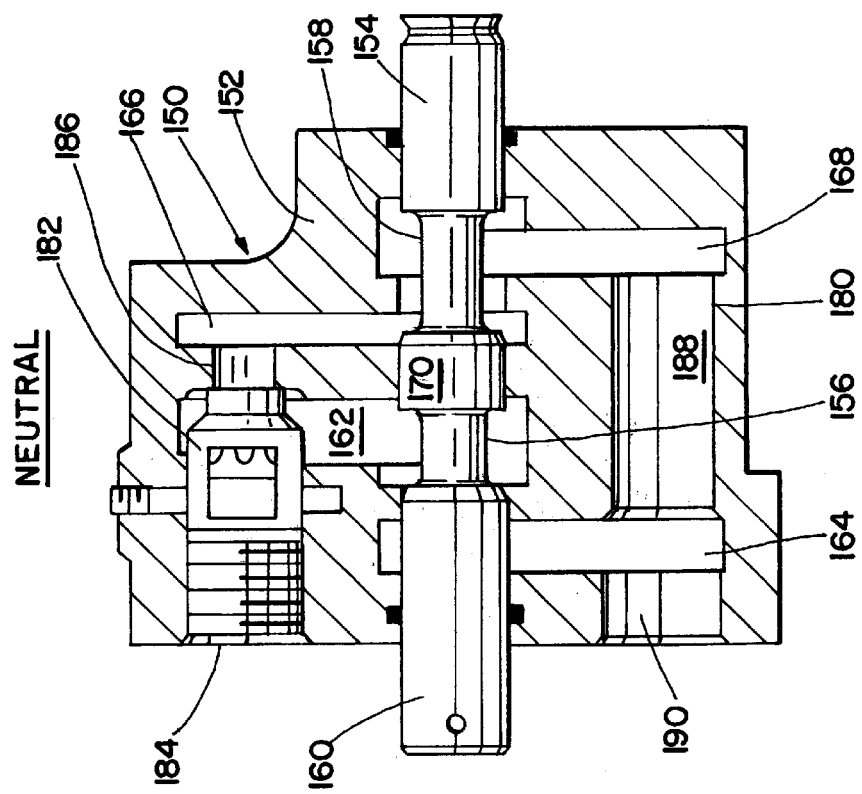
FIGS. 5–7 are transverse views corresponding to FIGS. 2–4, respectively, and illustrating the multiple pressure relief valve of the present invention installed within a control valve which is in the neutral, raise and lower positions, respectively.
Figure 4:
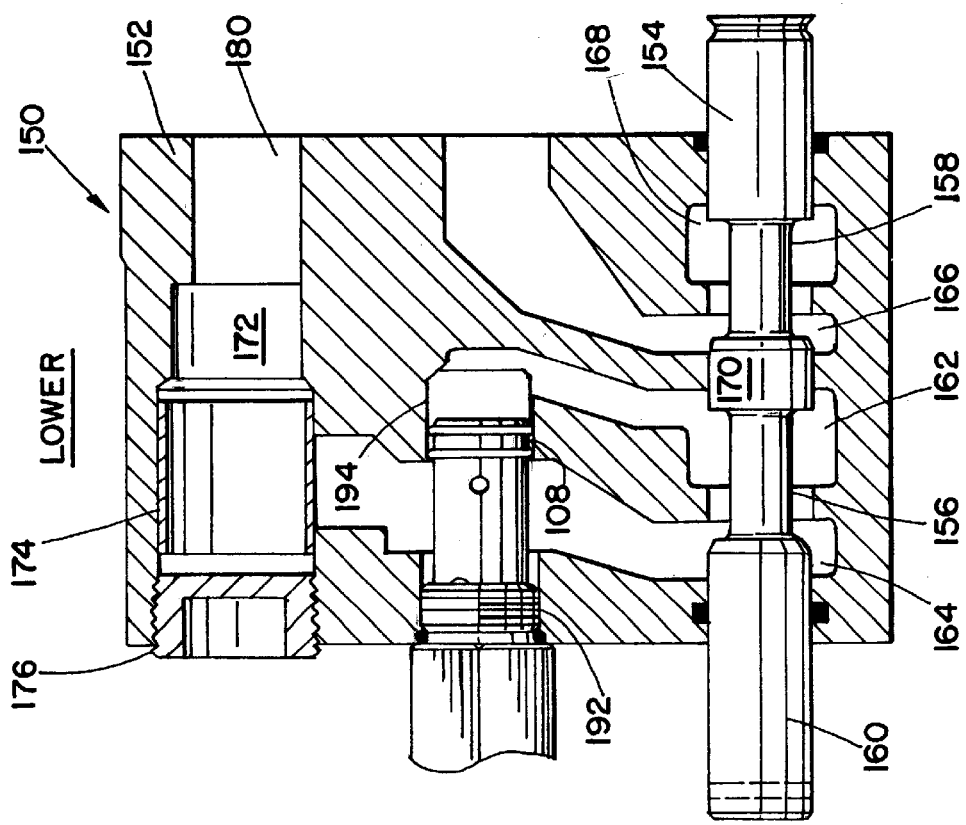
Figure 6:
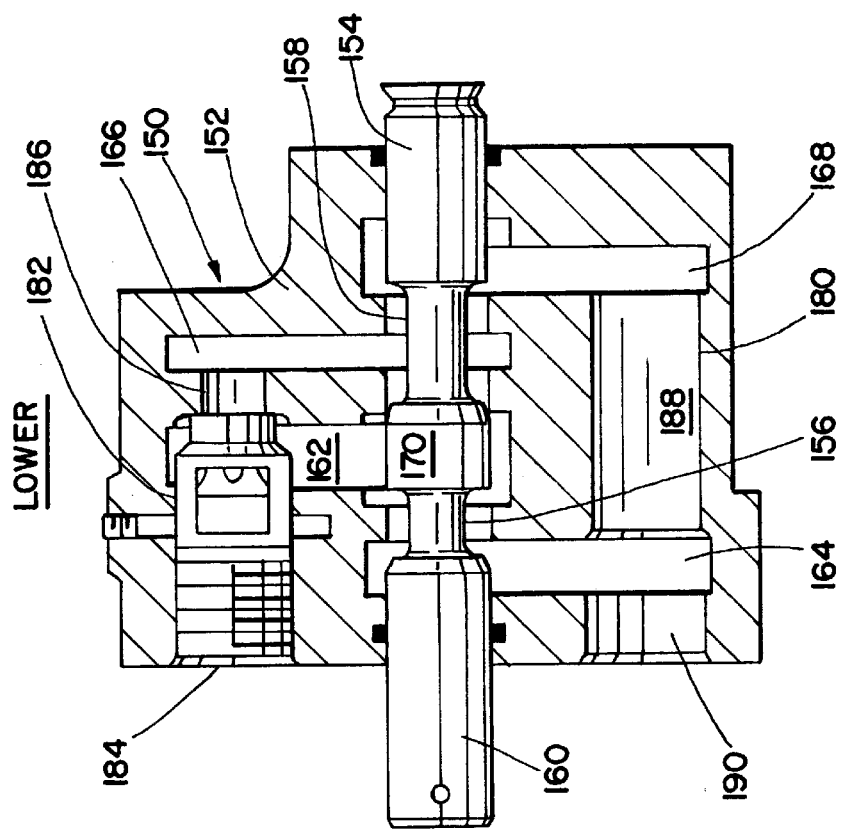
Figure 7:
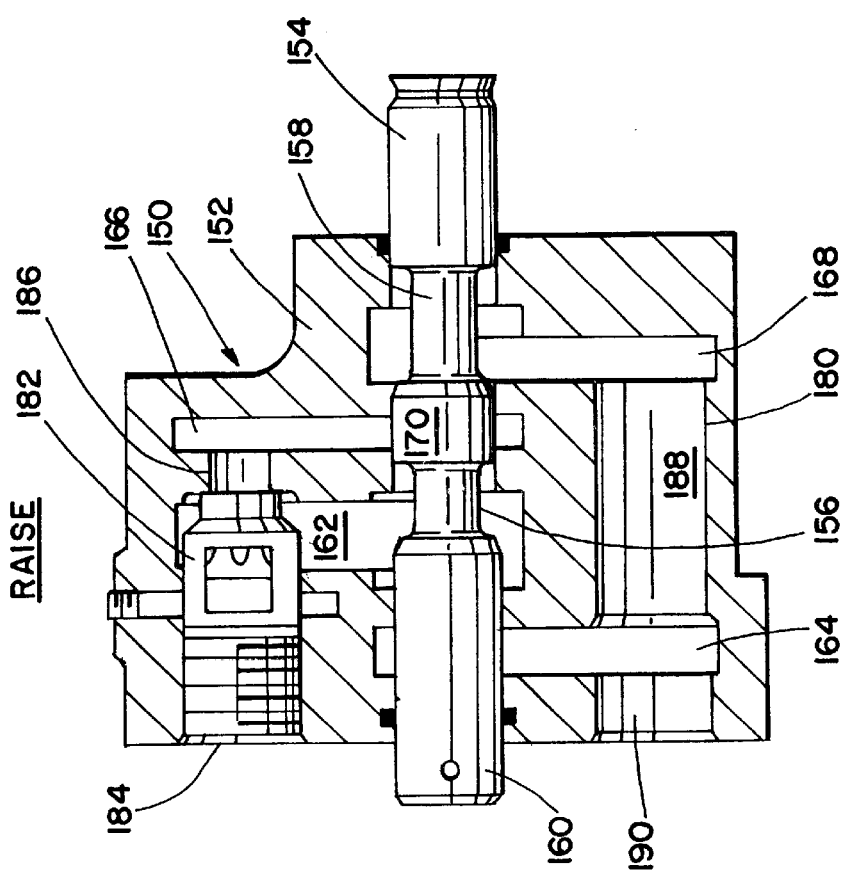

Referring now FIGS. 2–4, elevational views of the multiple pressure relief valve 10 of the present invention installed within a control valve 150, shown in cross-section, in the neutral, raise and lower positions, respectively, are illustrated. Similarly, FIGS. 5–7 are transverse views corresponding to FIGS. 2–4, respectively, and illustrating the relief valve 10 of the present invention installed within a control valve 150 in the neutral, raise and lower positions, respectively. In these Figures, the control valve 150 is associated with a hydraulic pump (not shown) and is comprised of a housing 152 having a spool 154 slidably movable therein. The spool 154 is provided with a pair of annular grooves 156 and 158 intermediate its ends; end 160 of spool 154 adjacent to annular groove 156 isolates cylinder chamber 162 from tank chamber 164 when the control valve 150 is in the neutral and raise positions and annular groove 156 interconnects cylinder chamber 162 and tank chamber 164 when the control valve 150 is in the lower position. Annular groove 158 interconnects pump chamber 166 and tank chamber 168 when the control valve 150 is in the neutral and lower positions and the portion 170 of spool 154 interposed between annular grooves 156 and 158 isolates pump chamber 166 and tank chamber 168 when the control valve 150 is in the raise position. Pump chamber 166 is fluidly connected to the outlet of the hydraulic pump (not shown) associated with the control valve 150. Tank chamber 164 is isolated from inlet chamber 172 by means of a sleeve 174. Inlet chamber 172 has a plug 176 at end 178 and a pump inlet port 180 at the other end thereof for connection to the inlet of the hydraulic pump (not shown).

Referring now to FIGS. 5–7, these Figures illustrate a check valve 182 received within a threaded bore 184 in housing 152 and positioned therein so as to interconnect pump chamber 166 to cylinder chamber 162 via a check valve bore 186. Housing 152 is also provided with a bore 188 which intersects tank chambers 164, 168. Bore 188 has a port 190 which provides a return to tank.

Referring again to FIGS. 1–4, the second outer diameter portion 106 and third outer diameter portion 108 of relief valve housing 60 are received within a threaded bore 192 in housing 152 permitting threaded portion 104 of relief valve housing 60 to be threadably received within bore 194 in housing 152. When received within housing 152, the third outer diameter portion 108 of relief valve housing 60 is positioned within bore 194 in housing 152 isolating cylinder chamber 162 and tank chamber 164 via contact of O-ring 110 within bore 194 in housing 152. In this manner, oppositely disposed cross-bores 118, 120 provided within second outer diameter portion 106 of relief valve 60 are within tank chamber 164 and O-ring 114 seals threaded portion 104 of relief valve housing 60 against the exterior of housing 152 of control valve 150.

Operationally, when the control valve 150 is in the neutral position, as shown in FIGS. 2 and 5, flow from the hydraulic pump (not shown) is directed from the pump chamber 166 to the tank chamber 168 and no flow is provided to the hydraulic cylinder. When the control valve 150 is in the raise position, as shown in FIGS. 3 and 6, flow from the hydraulic pump is directed from the pump chamber 166 to the cylinder chamber 162 via check valve bore 186 and check valve 182. When the control valve 150 is in the lower position, as shown in FIGS. 4 and 7, flow from the cylinder chamber 162 to the tank chamber 164 occurs. Regardless of whether the control valve 150 is in the neutral, raise or lower position, if the pressure within the cylinder chamber 162 exceeds the pre-determined actuating pressure of the multiple pressure relief valve 10, the poppet valve arrangement 62 within same opens permitting the flow of fluid from the cylinder chamber 162 to the tank chamber 164.

Certain modifications and improvements will occur to those skilled in the art upon reading the foregoing. It is understood that all such modifications and improvements have been deleted herein for the sake of conciseness and readability, but are properly within the scope of the following claims.

We claim:

1. A multiple pressure relief valve comprising an actuating cylinder having a piston with a blind bore therein, a poppet actuated relief valve, an adjustment member interconnecting said actuating cylinder and said poppet actuated relief valve, a first spring member biasing said poppet actuated relief valve causing said poppet actuated relief valve to be actuatable at a first pre-determined pressure, a second spring member received within said blind bore in said piston and biasing said poppet actuated relief valve causing said poppet actuated relief valve to be actuatable at a second pre-determined pressure, a spring guide member and an actuator rod interconnecting said spring guide member and said poppet actuated relief valve.

2. The valve as defined in claim 1 wherein said actuator rod is received within said first spring member and said adjustment member.

3. The valve as defined in claim 1 wherein said adjustment member is threaded on the outer surface thereof and further including a pair of lock nuts, one of said pair of lock nuts contacting said actuating cylinder, the other of said pair of lock nuts contacting said poppet actuated relief valve.

4. The valve as defined in claim 3 wherein said lock nuts are threadably advanceable and retractable on said adjustment member.

5. The valve as defined in claim 1 wherein said first spring member and said second spring member are oriented so as to be in a parallel relationship with respect to one another.

* * * * *